US009215265B2

(12) United States Patent
Bouazizi

(10) Patent No.: US 9,215,265 B2
(45) Date of Patent: Dec. 15, 2015

(54) CACHING DIRECTIVES FOR A FILE DELIVERY PROTOCOL

(75) Inventor: Imed Bouazizi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 538 days.

(21) Appl. No.: 11/842,904

(22) Filed: Aug. 21, 2007

(65) Prior Publication Data

US 2008/0046575 A1 Feb. 21, 2008

Related U.S. Application Data

(60) Provisional application No. 60/839,261, filed on Aug. 21, 2006.

(51) Int. Cl.
*H04L 29/06* (2006.01)
*H04L 29/08* (2006.01)

(52) U.S. Cl.
CPC ............... *H04L 67/06* (2013.01); *H04L 67/28* (2013.01); *H04L 67/2852* (2013.01); *H04L 67/04* (2013.01)

(58) Field of Classification Search
USPC .......................................................... 709/228
See application file for complete search history.

(56) References Cited

U.S. PATENT DOCUMENTS

| 2003/0236912 | A1 | 12/2003 | Klemets et al. | |
|---|---|---|---|---|
| 2004/0049598 | A1* | 3/2004 | Tucker et al. | 709/246 |
| 2005/0198343 | A1* | 9/2005 | Yoshimura et al. | 709/231 |
| 2005/0207415 | A1* | 9/2005 | Curcio et al. | 370/390 |
| 2005/0223098 | A1* | 10/2005 | Rimac et al. | 709/227 |
| 2005/0262187 | A1* | 11/2005 | Klemets | 709/203 |
| 2006/0022048 | A1* | 2/2006 | Johnson | 235/462.1 |
| 2006/0123099 | A1* | 6/2006 | Paila et al. | 709/219 |
| 2007/0006274 | A1* | 1/2007 | Paila et al. | 725/118 |
| 2007/0156815 | A1* | 7/2007 | Mate et al. | 709/204 |
| 2007/0168523 | A1* | 7/2007 | Jiang et al. | 709/228 |

OTHER PUBLICATIONS

First Office Action issued in connection with Chinese Patent Application No. 200780039225.6, dated Feb. 28, 2012.
Paila, T., et al.; "FLUTE—File Delivery over Unidirectional Transport"; Network Working Group; Request for Comments: 3926; Oct. 2004.
Luby, M., et al.; "Asynchronous Layered Coding (ALC) Protocol Instantiation"; Network Working Group; Request for Comments: 3450; Dec. 2002.
Luby, M., et al.; "Layered Coding Transport (LCT) Building Block"; Network Working Group; Request for Comments: 3451; Dec. 2002.
Luby, M., et al.; "Forward Error Correction (FEC) Building Block"; Network Working Group; Request for Comments: 3452; Dec. 2002.

(Continued)

*Primary Examiner* — Asghar Bilgrami
(74) *Attorney, Agent, or Firm* — Alston & Bird LLP

(57) ABSTRACT

An extension to a file delivery protocol which permits the signaling of cache control information to a receiving device. Various embodiments of the present invention permit a server or other sending device to signal instructions regarding cache control to a receiving device using the file delivery protocol. This signaling may include information such as whether the receiving device should cache a file, how long the file should be cached for, and/or a cache priority assignment for the file. Various embodiments of the present invention may be particularly useful in the transmission of rich media content, where some content may be sent over RTP while other information is transmitted via the file delivery protocol.

32 Claims, 5 Drawing Sheets

(56) References Cited

OTHER PUBLICATIONS

Fielding, R., et al.; "Hypertext Transfer Protocol—HTTP/1.1"; Network Working Group; Request for Comments: 2616; Jun. 1999.
Office Action from Chinese Patent Application No. 200780039225.6, Dated Sep. 20, 2012.
3GPP TSG-SA4#40, Aug. 28-Sep. 1, 2006, Tdoc S4-060475; Source: Nokia, Title: Caching and synchronization support in FLUTE; Document for: Discussion and Proposal; Agenda item: x.
International Search Report for PCT Application No. PCT/IB2007/053339T.
The State Intellectual Property Office of the P.R.C., Notification of Third Office Action for Application No. 200780039225.6, dated Mar. 14, 2013, 6 pages, China.
Office Action from Indian Patent Application No. 1241/DELNP/2009, dated Feb. 9, 2015.
Written Opinion from International Application No. PCT/IB2007/053339 dated Apr. 2, 2008.

* cited by examiner

| 0 | | | | | | | | | 1 | | | | | | | | | 2 | | | | | | | | | 3 | |
|---|---|---|---|---|---|---|---|---|---|---|---|---|---|---|---|---|---|---|---|---|---|---|---|---|---|---|---|
| 0 1 2 3 4 5 6 7 | | | | | | | | 8 9 0 1 2 3 4 5 | | | | | | | | 6 7 8 9 0 1 2 3 | | | | | | | | 4 5 6 7 8 9 0 1 | | | |
| HET | | | | | | | | HEL | | | | | | | | CC | | | | | | | | Priority | | | |
| Expiry Date (NTP timestamp or other format) | | | | | | | | | | | | | | | | | | | | | | | | | | | |

CACHING DIRECTIVES FOR A FILE DELIVERY PROTOCOL

CROSS-REFERENCE TO RELATED APPLICATIONS

The present application claims priority to U.S. Provisional Application No. 60/839,261, filed Aug. 21, 2006.

FIELD OF THE INVENTION

The present invention relates generally to the use of a file delivery protocol. More particularly, the present invention relates to the signaling of caching requirements using such a file delivery protocol.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, mobile broadcast solutions have been standardized by different organizations, such as the 3$^{rd}$ Generation Partnership Project (3GPP) Multimedia Broadcast Multicast Service (MBMS), the Digital Video Broadcasting (DVB) Convergence of Broadcast and Mobile Services (CBMS), and the Open Mobile Alliance (OMA) Broadcast (BCAST) organizations. The two primary services provided by such multicast/broadcast solutions are streaming and file delivery services. Although streaming services are considered to be the primary driver of this technology, file delivery is expected to generate a significant amount of the traffic and activity over time. For example, in the delivery of music and video clips, the file delivery may comprise the primary application component. Alternatively, file delivery may be a secondary component of the application, such as in the case of rich media applications and zapping streams.

In the case of file delivery, File Delivery Over Unidirectional Transport (FLUTE) can be used as the file delivery protocol. As discussed in the Network Working Group's Request for Comments (RFC) 3926, which can be found at www.ietf.org/rfc/rfc3926.txt and is incorporated herein by reference in its entirety, FLUTE is defined by the Internet Engineering Task Force (IETF), and a revision of this document is currently in progress. FLUTE is based on Asynchonous Layered Coding (ALC) Protocol Instantiation, which can be found in RFC 3450 (www.ietf.org/rfc/rfc3451.txt, www.ietf.org/rfc/rfc3451.txt, incorporated herein by reference in its entirety.) ALC comprises a set of building blocks such as the Layered Coding Transport (LCT) block, which can be found in RFC 3451 (www.ietf.org/rfc/rfc3451.txt, www.ietf.org/rfc/rfc3451.txt, incorporated herein by reference in its entirety) and the Forward Error Correction (FEC) building block, which can be found in RFC 3452 (www.ietf.org/rfc/rfc3452.txt, incorporated herein by reference in its entirety). FLUTE extends ALC by, among others, defining mechanisms to describe the contents of the FLUTE session. This is achieved by introducing a well-known object with a Transport Object Identifier (TOI) equal to 0, carrying a File Delivery Table (FDT) instance. The FDT instance lists a set of files and their corresponding transport options. The FDT is an extensible markup language (XML) file following a schema defined in the FLUTE specification. The semantics of the FDT were mainly taken from the Hypertext Transfer Protocol (HTTP) 1.1 protocol, which can be found in RFC 2616 (www.ietf.org/rfc/rfc2616.txt, incorporated herein by reference in its entirety.)

3GPP is currently specifying a rich media solution which will allow for rich media scenes to be multicast to a large set of users and allow for user interactivity. The rich media solution is based on both streaming and file delivery mechanisms. In this solution, the server may transmit rich media scenes, images, and other files over FLUTE, while transport scene updates and other real-time and dynamic content are transmitted over the Real-Time Transport Protocol (RTP). The static content transported over FLUTE may have a longer lifespan than the dynamic content and may be reused a long time after its delivery and by different applications.

With the emergence of new applications such as rich media applications, new requirements for the transport protocols have emerged. Those requirements stem in large part from the need to transport some parts of the content of the application over FLUTE, while the other part is being streamed using RTP. An example of such a scenario is the transport of some images over FLUTE, which are being referred to from a rich media scene. The scene description may be transported over FLUTE or RTP, whereas the scene updates are typically transported over RTP. The receiver does not know a priori when a given image will be deployed in the rich media scene. On the other hand, as only the delivery over FLUTE of such image files is currently possible, a priori download of such files is beneficial, so that they are available at their deployment time in the dynamic rich media scene. Furthermore, some files may be reused quite often by the application, or files may be shared by several applications. In the case of rich media scenes, some image files may represent objects in the rich media scene which may appear and disappear several times within the scene. However, there is currently no signaling in FLUTE or other proposed rich media standards (including the Mobile Open Rich-media Environment (MORE) standard) that can be used by a server to indicate to receivers that a file will be reused by the application.

Although HTTP defines a set of cache control mechanisms to define the behavior of the client, server, and the web cache nodes in the network, it does not define directives for the receiver to store a given object/file for a given period of time. In this arrangement, the server can only indicate an estimation of the expiration time of the object, until which the receiver can assume that the object is up to date.

In light of the above, it would be desirable for a server to be capable of signaling caching recommendations, as foreseen by the sender/content provider, to the receivers. It would also be desirable to be able to have each file contain caching directives for indicating how long a file is to be kept in the cache. It would also be helpful for each file to be assigned a priority, which can be used by the receiver to decide which files to keep in the cache when running out of storage capacity. Lastly, it would be desirable for these types of caching directives to be in the form of recommendations and not mandatory for the receiver. However, FLUTE does not provide caching directives.

SUMMARY OF THE INVENTION

One embodiment of the present invention involves an extension to the FLUTE protocol which permits the signaling of cache control information to a receiving device. The present invention permits a server or other sending device to signal instructions such as whether the receiving device should cache a file, how long the file should be cached, and/or a caching priority assignment for the file.

In one embodiment of the present invention, caching directives are included alongside with the file metadata, which allows both a file delivery protocol compliant receiver and application to handle the directives. Additionally, the caching directives of the present invention allow for different instructions by the server/content provider on how to handle different files.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

One embodiment of the present invention involves an extension to the FLUTE protocol so that a sending device can provide caching instructions and/or recommendations to a receiving device for a particular file. The FLUTE specification provides extension mechanisms in the FDT XML schema and in the packet header. The FDT extension mechanism provides a mechanism for adding metadata related to a specific file or a group of files. The present invention uses this extension mechanism to provide caching directives along with the file metadata.

Figures 1, 3:
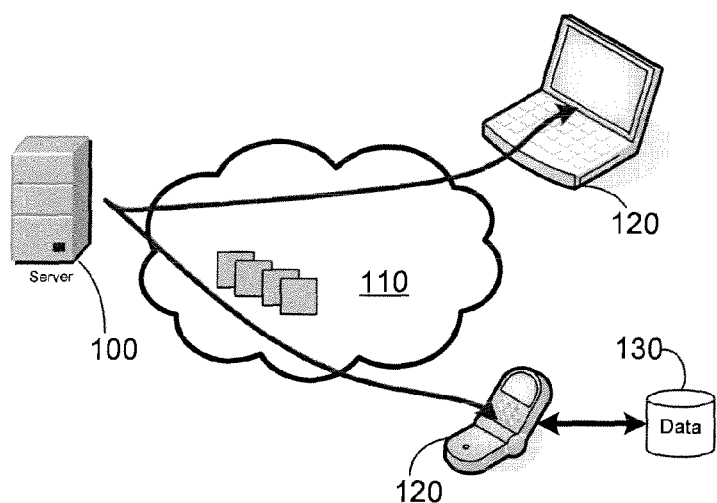
FIG. 1 is a representation showing the delivery of files from a server to a plurality of electronic devices, as well as the caching and retrieval of data according to the present invention.
FIG. 3 is a representation of an LCT header extension for caching directives according to one embodiment of the present invention.

FIG. 1 is a simplified representation showing how a file or group of files can be transferred and cached according to the present invention. As shown in FIG. 1, a server 100 is capable of transferring files over a network 110 to various electronic devices 120. These electronic devices 120 can then selectively store the files in a local or remote cache 130 in accordance with instructions or directives received from the server 100.

According to an embodiment of the present invention, a server or other sending device can use one of several cache directives to indicate recommendations to the file delivery protocol compliant receiver on how to cache a given file or set of files. The following is a list of cache directives which could be signaled to a receiving device in various embodiments of the present invention. However, it should be noted that other directives may be used instead of and/or in addition to those directives discussed herein. In the following description, FLUTE is used as an exemplary file delivery protocol. However, other file delivery protocols may also be used.

No Cache. A "no cache" directive or instruction can be used to indicate to a receiving device that it should not cache a specific file or set of files. This instruction can be useful, for example, in situations where a file is expected to be highly dynamic (i.e., where there is likely to be many changes to the file over time), as well as situations where the file is likely to be used only once by an application at the receiving device.

Permanent Cache. A "permanent cache" directive or instruction can be used to indicate to the FLUTE receiving device that a specific file or set of files should be permanently cached or cached for an indefinite period of time, if possible. This instruction may be helpful in situations, for example, where a delivered filed is going to be frequently used by an application over time.

Valid To. A "valid to" directive or instruction can be used to indicate to the FLUTE receiving device an expected expiration time of a specific file or set of files. In particular, a "valid to" directive can indicate a date and time value in the HTTP date format.

Cache Priority. A "cache priority" directive or instruction can be used to indicate to the FLUTE receiving device a priority level of the file or set of files. For example, the priority level may be assigned to reflect the estimated number of times the file or set of files will be used during its validity period. In a receiving device with a limited cache, this directive or instruction allows the device to easily decide, when available space is low, which files should be the first to be discarded. It should be noted that the instruction types discussed previously define a first level prioritization algorithm, in the sense that they also provide information on the priority of the file or set of files. For example, files that are marked with permanent-cache have higher priority than files with a limited caching duration.

In various embodiments of the present invention, each of the directives/instructions discussed above is present in the file element of the FDT. They can also apply to a set of files, which are described by a single FDT instance, in the case where the caching directives are in the FDT instance element.

The following is a description of one possible implementation of the embodiment of the invention discussed above. This description depicts the changes to the FDT XML schema in order to add support for the caching directives, with the changes shown in bold. It should be noted, however, that other implementations are also possible.

```
<?xml version="1.0" encoding="UTF-8"?>
    <xs:schema xmlns="urn:ietf:params:xml:ns:fdt"
            xmlns:xs="http://www.w3.org/2001/XMLSchema"
            targetNamespace="urn:ietf:params:xml:ns:fdt"
            elementFormDefault="qualified">
    <xs:element name="FDT-Instance"
    type="FDT-InstanceType"/>
    <xs:complexType name="FDT-InstanceType">
        <xs:sequence>
            <xs:element name="File" type="FileType"
            maxOccurs="unbounded"/>
                    <xs:element name="Caching"
                    type="CachingType"/>
            <xs:any namespace="##other" processContents="skip"
                    minOccurs="0" maxOccurs="unbounded"/>
        </xs:sequence>
        <xs:attribute name="Expires"
                    type="xs:string"
                    use="required"/>
        <xs:attribute name="Complete"
                    type="xs:boolean"
                    use="optional"/>
        <xs:attribute name="Content-Type"
                    type="xs:string"
                    use="optional"/>
```

```
<xs:attribute name="Content-Encoding"
               type="xs:string"
               use="optional"/>
<xs:attribute name="FEC-OTI-FEC-Encoding-ID"
               type="xs:unsignedByte"
               use="optional"/>
<xs:attribute name="FEC-OTI-FEC-Instance-ID"
               type="xs:unsignedLong"
               use="optional"/>
<xs:attribute
    name="FEC-OTI-Maximum-Source-Block-Length"
               type="xs:unsignedLong"
               use="optional"/>
<xs:attribute name="FEC-OTI-Encoding-Symbol-Length"
               type="xs:unsignedLong"
               use="optional"/>
<xs:attribute
    name="FEC-OTI-Max-Number-of-Encoding-Symbols"
               type="xs:unsignedLong"
               use="optional"/>
<xs:attribute name="FEC-OTI-Scheme-Specific-Info"
               type="xs:base64Binary"
               use="optional"/>
<xs:anyAttribute processContents="skip"/>
</xs:complexType>
<xs:complexType name="FileType">
    <xs:sequence>
        <xs:element name="Caching"
            type="CachingType"/>
        <xs:any namespace="##other" processContents="skip"
               minOccurs="0" maxOccurs="unbounded"/>
    </xs:sequence>
    <xs:attribute name="Content-Location"
               type="xs:anyURI"
               use="required"/>
    <xs:attribute name="TOI"
               type="xs:positiveInteger"
               use="required"/>
    <xs:attribute name="Content-Length"
               type="xs:unsignedLong"
               use="optional"/>
    <xs:attribute name="Transfer-Length"
               type="xs:unsignedLong"
               use="optional"/>
    <xs:attribute name="Content-Type"
               type="xs:string"
               use="optional"/>
    <xs:attribute name="Content-Encoding"
               type="xs:string"
               use="optional"/>
    <xs:attribute name="Content-MD5"
               type="xs:base64Binary"
               use="optional"/>
    <xs:attribute name="FEC-OTI-FEC-Encoding-ID"
               type="xs:unsignedByte"
               use="optional"/>
    <xs:attribute name="FEC-OTI-FEC-Instance-ID"
               type="xs:unsignedLong"
               use="optional"/>
    <xs:attribute
        name="FEC-OTI-Maximum-Source-Block-Length"
               type="xs:unsignedLong"
               use="optional"/>
    <xs:attribute name="FEC-OTI-Encoding-Symbol-Length"
               type="xs:unsignedLong"
               use="optional"/>
    <xs:attribute
        name="FEC-OTI-Max-Number-of-Encoding-Symbols"
               type="xs:unsignedLong"
               use="optional"/>
    <xs:attribute name="FEC-OTI-Scheme-Specific-Info"
               type="xs:base64Binary"
               use="optional"/>
    <xs:anyAttribute processContents="skip"/>
</xs:complexType>
<xs:complexType name="CachingType">
    <xs:attribute name="Cache-Control"
               type="ControlType"
               use="required"/>
    <xs:attribute name="expires"
               type="xs:dateTime"
               use="optional"/>
    <xs:attribute name="Priority"
               type="PriorityType"/>
               use="optional"/>
</xs:complexType>
<xs:simpleType name="ControlType">
    <xs:restriction base="xs:string">
        <xs:enumeration>
            <xs:enumeration name="no-cache" />
            <xs:enumeration name="permanent-cache" />
            <xs:enumeration name="valid-to"/>
        </xs:enumeration>
    </xs:restriction>
</xs:simpleType>
<xs:simpleType name="PriorityType">
    <xs:restriction base="xs:integer">
        <xs:minInclusive value="0"/>
        <xs:maxInclusive value="100"/>
    </xs:restriction>
</xs:simpleType>
</xs:schema>
```

The additions to the schema described above are as follows. The "caching" element serves to indicate to the receiving device the presence of caching information. The "Cache-Control" element indicates to the receiving device the type of the caching control directive. The "Cache-Control" element can take one of the following values: "no-cache", "permanent-cache", or "valid-to." The "expires" element contains an indication of the expiry date of the file or group of files. This indication should only be present if the cache-control directive is "valid-to" a certain time. The "Priority" attribute, in this particular embodiment, can take a value between 0 and 100, where 100 is the maximum priority.

In an another embodiment of the present invention, the same information discussed above may be carried in the header fields of the transport packets, such as FLUTE/ALC packets in form of an LCT extension header. This field is a binary encoding of the previously stated caching directives. As is common with LCT headers, information carried in the extension header should have higher priority than information carried in the FDT.

FIG. 3 is a representation of an LCT extension header in accordance with this particular embodiment of the present invention. The Header Extension Type (HET) field carries the code for this LCT header extension. The Header Extension Length (HEL) field indicates the length of the extension header as the variable extension header is being used (HET>128). The Cache Control (CC) field indicates the cache control and can refer to one of the three previously indicated cache control directives ("no-cache", "permanent-cache" or "valid-to"). The Priority field indicates the priority of the related file in the customer cache. The expiration date indicates the exact date and time at which the related file may be removed from the cache. The format of this field can comprise, for example, the Network Time Protocol (NTP) timestamp format or any other date and time format.

Figure 2:
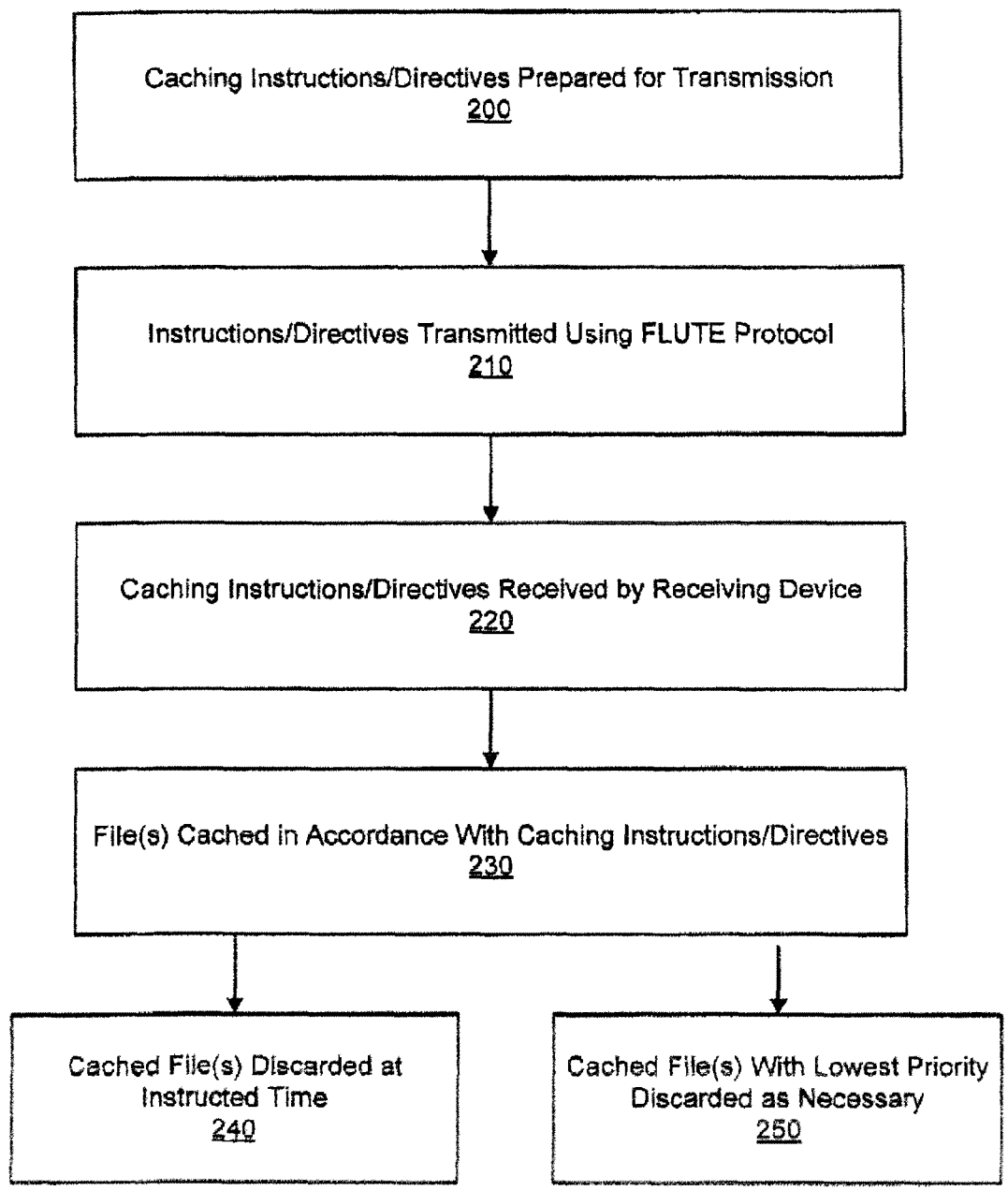
FIG. 2 is a flow chart showing a process by which caching instructions are provided to a receiving device in accordance with various embodiments of the present invention.

FIG. 2 is a flow chart showing a basic process by which the embodiments of the present invention may be implemented. At 200 in FIG. 2, a server or other sending device prepares caching instructions or directives for subsequent use by a receiving device. These caching instructions may comprise instructions of the type discussed above. At 210, the server or sending devices transmits the caching instructions using the FLUTE protocol. At 220, these instructions are received by one or more receiving devices. At 230, each receiving device processes the instructions and caches the file or files in accordance with the instructions. Subsequently, various actions can take place depending upon the instructions. For example, if a specific time is given upon which the receiving device should discard the file, then, at 240, the cached file is discarded at the appropriate moment. Alternatively, if the receiving device runs out of space for caching files, then files of the lowest priority are discarded as necessary at 250.

Figure 4:
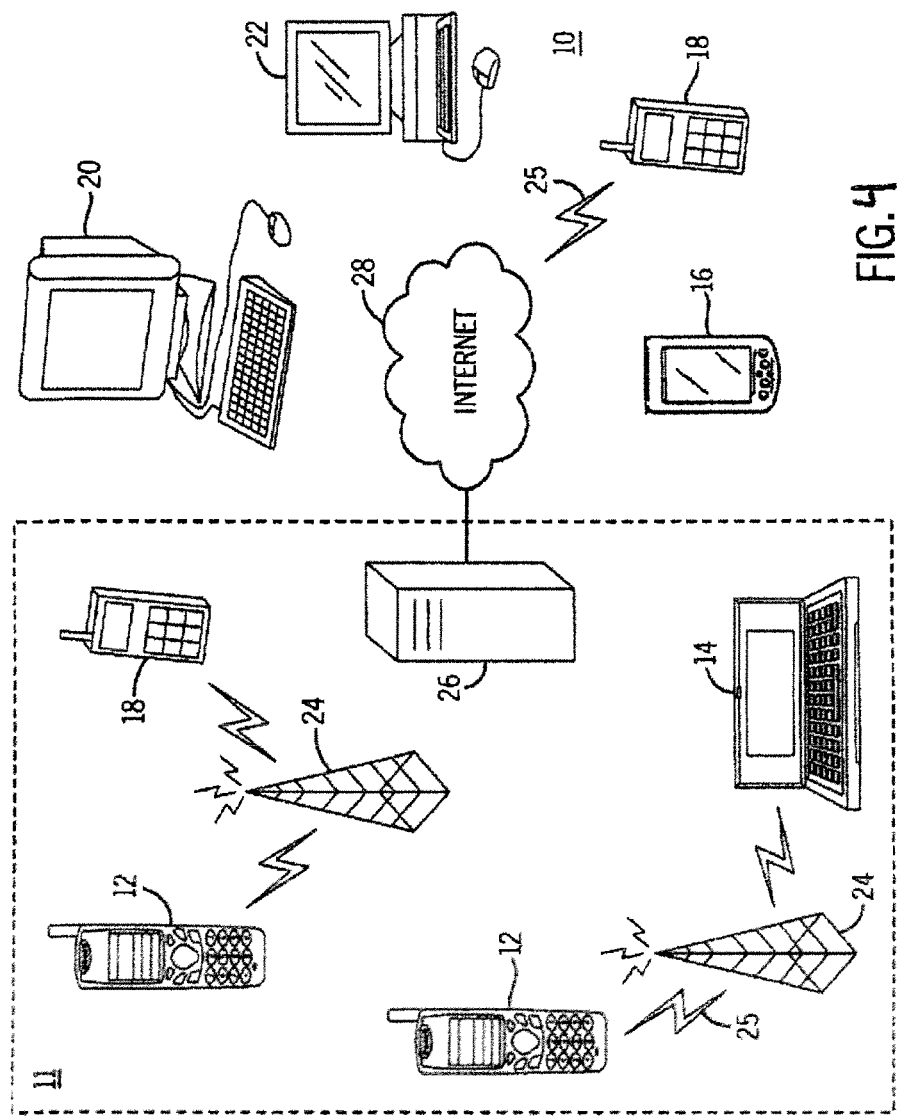
FIG. 4 is an overview diagram of a system within which the present invention may be implemented.

FIG. 4 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 4 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 5:
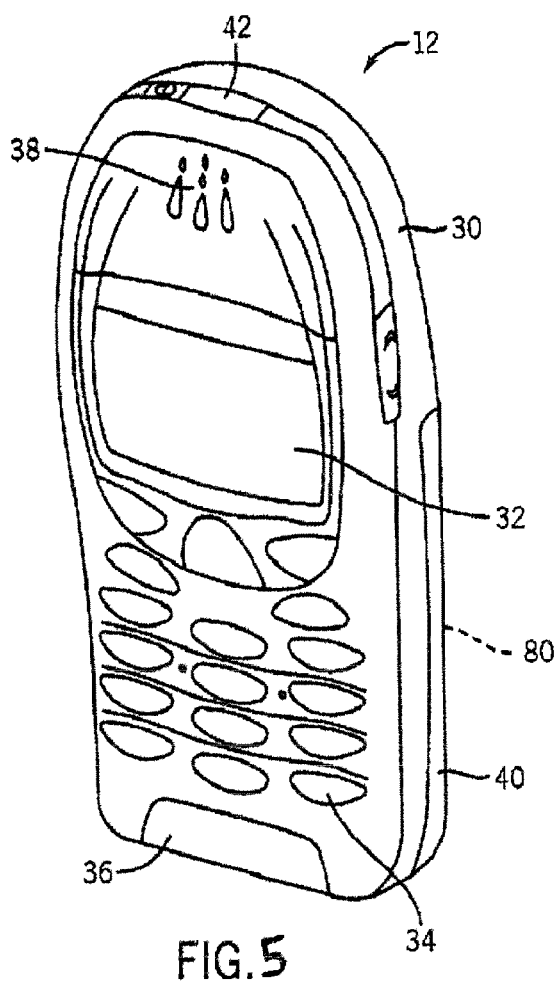
FIG. 5 is a perspective view of a mobile device that can be used in the implementation of the present invention.
Figure 6:
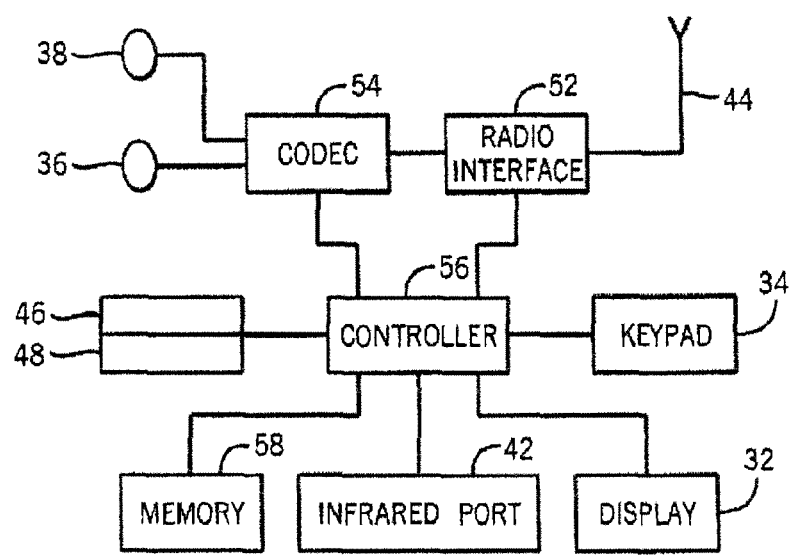
FIG. 6 is a schematic representation of the circuitry of the mobile telephone of FIG. 5.

FIGS. 5 and 6 show one representative mobile telephone 12 within which the present invention may be implemented. It should be understood, however, that the present invention is not intended to be limited to one particular type of mobile telephone 12 or other electronic device. The mobile telephone 12 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
preparing an extension mechanism in accordance with a file delivery protocol for at least one file, the extension mechanism including at least one instruction relating to the caching of the at least one file by a receiving device; and
causing the extension mechanism to be transmitted including the at least one instruction to the receiving device using the file delivery protocol;
wherein the at least one instruction comprises predefined and selectable cache control directives including a catche control directive that directs the receiving device not to cache the at least one file, a catche control directive that directs the receiving device to cache the at least one file for an indefinite period of time, and a cache control directive that directs the receiving device to cache the at least one file until an expected expiration time.

2. The method of claim 1, wherein the extension mechanism comprises code within the file delivery table extensible markup language schema for the File Delivery Over Unidirectional Transport protocol.

3. The method of claim 1, wherein the extension mechanism comprises a Layered Coding Transport header.

4. The method of claim 1, wherein the at least one predefined cache control directive assigns a priority level to the at least one file for use by the receiving device in deciding whether the at least one file should no longer be cached.

5. A computer program product comprising a non-transitory computer-readable storage medium storing program code portions therein, the program code portions being configured to, upon execution, cause an apparatus to at least:

prepare an extension mechanism in accordance with a file delivery protocol for at least one file, the extension mechanism including at least one instruction relating to the caching of the at least one file by a receiving device; and causing the extension mechanism to be transmitted including the at least one instruction to the receiving device using the file delivery protocol;

wherein the at least one instruction comprises predefined and selectable cache control directives including a cache control directive that directs the receiving device not to catch the at least one file, a cache control directive that directs the receiving device to cache the at least one file for an indefinite period of time, and a cache control directive that directs the receiving device to cache the at least one file until an expected expiration time.

6. An apparatus, comprising:

a processor; and a memory including executable instructions, the memory and the executable instructions being configured to, together, with the processor, cause the apparatus to at least:

prepare an extension mechanism in accordance with a file delivery protocol for at least one file, the extension mechanism including at least one instruction relating to the caching of the at least one file by a receiving device, and cause the extension mechanism to be transmitted including the at least one instruction to the receiving device using the file delivery protocol;

wherein the at least one instruction comprises predefined and selectable cache control directives including a cache control directive that directs the receiving device not to catch the at least one file, a cache control directive that directs the receiving device to cache the at least one file for an indefinite period of time, and a cache control directive that directs the receiving device to cache the at least one file until an expected expiration time.

7. The apparatus of claim 6, wherein the extension mechanism comprises code within the file delivery table extensible markup language schema for the File Delivery Over Unidirectional Transport protocol.

8. The apparatus of claim 6, wherein the extension mechanism comprises a Layered Coding Transport header.

9. The apparatus of claim 6, wherein the at least one predefined cache control directive assigns a priority level to the at least one file for use by the receiving device in deciding whether the at least one file should no longer be cached.

10. An apparatus, comprising:

a processor; and a memory including executable instructions, the memory and the executable instructions being configured to, together with the processor, cause the apparatus to at least:

prepare an extension mechanism in accordance with a file delivery protocol for at least one file, the extension mechanism including at least one instruction relating to the caching of the at least one file by at least one receiving device, and cause the extension mechanism including the at least one instruction to be forwarded to at least one other connected device using the file delivery protocol;

wherein the at least one instruction comprises at least one predefined cache control directive that directs the receiving device to cache the at least one file for an indefinite period of time;

wherein the at least one instruction comprises predefined and selectable cache control directives including a cache control directive that directs the receiving device not to catch the at least one file, a cache control directive that directs the at least one receiving device to cache the at least one file for an indefinite period of time, and a cache control directive that directs the receiving device to cache the at least one file until an expected expiration time.

11. A method, comprising:

receiving an extension mechanism via a file delivery protocol from a sending device, the extension mechanism including at least one instruction relating to the caching of at least one file; and causing selective caching of the at least one file in accordance with the at least one instruction;

wherein the at least one instruction comprises predefined and selectable cache control directives including a cache control directive that directs non-caching of the at least one file, a cache control directive that directs caching of the at least one file for an indefinite period of time, and a cache control directive that directs caching the at least one file until an expected expiration time. least one file for an indefinite period of time.

12. The method of claim 11, wherein the extension mechanism comprises code within the file delivery table extensible markup language schema for the File Delivery Over Unidirectional Transport protocol.

13. The method of claim 11, wherein the extension mechanism comprises a Layered Coding Transport header.

14. The method of claim 11, wherein the at least one predefined cache control directive assigns a priority level to the at least one file for use in deciding whether the at least one file should no longer be cached.

15. A computer program product comprising a non-transitory computer-readable storage medium storing program code portions therein, the program code portions being configured to cause an apparatus to at least:

receive an extension mechanism via a file delivery protocol from a sending device, the extension mechanism including at least one instruction relating to the caching of at least one file; and causing selective caching of the at least one file in accordance with the at least one instruction;

wherein the at least one instruction comprises predefined and selctable cache control directives including a cache control directive that directs non-caching of the at least one file, a cache control directive that directs caching of the at least one file for an indefinite period of time, and a cache control directive that directs caching of the at least one file until an expected expiration time.

16. An apparatus, comprising:

a processor; and a memory including executable instructions, the memory and the executable instructions, together with the processor, cause the apparatus to at least:

receive an extension mechanism via a file delivery protocol from a sending device, the extension mechanism including at least one instruction relating to the caching of at least one file; and cause selective caching of the at least one file in accordance with the at least one instruction;

wherein the at least one instruction comprises predefined and selectable cache control directives including a cache control directive that directs non-caching of the at least one file, a cache control directive that directs caching of the at least one file for an indefinite period of time, and a cache control directive that directs caching the at least one file until an expected expiration time.

17. The apparatus of claim 16, wherein the extension mechanism comprises code within the file delivery table extensible markup language schema for the File Delivery Over Unidirectional Transport protocol.

18. The apparatus of claim 16, wherein the extension mechanism comprises a Layered Coding Transport header.

19. The apparatus of claim 16, wherein the at least one predefined cache control directive assigns a priority level to the at least one file for use in deciding whether the at least one file should no longer be cached.

20. An apparatus, comprising:
a processor; and
a memory including executable instructions, the memory and the executable instructions, together with the processor, cause the apparatus to at least:
process an extension mechanism constructed in accordance with a file delivery protocol, the extension mechanism including at least one instruction relating to the caching of at least one file;
wherein the at least one instruction comprises predefined and selectable cache control directives including a cache control directive that directs non-caching of the at least one file, a cache control directive that directs caching of the at least one file for an indefinite period of time, and a cache control directive that directs caching the at least one file until an expected expiration time.

21. The apparatus of claim 20, wherein the extension mechanism comprises code within the file delivery table extensible markup language schema for the File Delivery Over Unidirectional Transport protocol.

22. The apparatus of claim 20, wherein the extension mechanism comprises a Layered Coding Transport header.

23. A system, comprising:
a sending device configured to:
prepare an extension mechanism in accordance with a file delivery protocol for at least one file, the extension mechanism including at least one instruction relating to the caching of the at least one file, and
transmit the extension mechanism including the at least one instruction using the file delivery protocol; and
a receiving device in at least selective communication with the sending device, the receiving device configured to:
receive the extension mechanism via the file delivery protocol from the sending device, and
cause selective caching of the at least one file in accordance with the at least one instruction;
wherein the at least one instruction comprises predefined and selectable cache control directives including a cache control directive that directs the receiving device not to cache the at least one file, a cache control directive that directs the receiving device to cache the at least one file for an indefinite period of time, and a cache control directive that directs the receiving device to cache the at least one file until an expected expiration time.

24. The system of claim 23, wherein the extension mechanism comprises code within the file delivery table extensible markup language schema for the File Delivery Over Unidirectional Transport protocol.

25. The system of claim 23, wherein the extension mechanism comprises a Layered Coding Transport header.

26. The method of claim 1, wherein the extension mechanism comprises a Layered Coding Transport (LCT) extension header, the LCT extension header comprising a cache control field comprising an indication of the predefined cache control.

27. The method of claim 26, wherein the Layered Coding Transport (LCT) extension header further comprises an expiration date field.

28. The method of claim 27, wherein the expiration date field contains a date and time at which the at least one file may be removed from a cache of the receiving device.

29. The method of claim 26, wherein the Layered Coding Transport (LCT) extension header further comprises a priority field.

30. The method of claim 29, wherein the priority field comprises an indication of a priority of the at least one file in a cache of the receiving device.

31. The method of claim 26, wherein the Layered Coding Transport (LCT) extension header further comprises a header extension type field.

32. The method of claim 26, wherein the Layered Coding Transport (LCT) extension header further comprises a header extension length field.

* * * * *

UNITED STATES PATENT AND TRADEMARK OFFICE
CERTIFICATE OF CORRECTION

PATENT NO. : 9,215,265 B2  
APPLICATION NO. : 11/842904  
DATED : December 15, 2015  
INVENTOR(S) : Bouazizi Page 1 of 1

It is certified that error appears in the above-identified patent and that said Letters Patent is hereby corrected as shown below:

In the claims:

Column 8,
Lines 47 and 48, "catche", both occurrences, should read --cache--.

Column 9,
Lines 12 and 35, "catch", both occurrences, should read --cache--;
Lines 65 and 66, "the receiving device" should read --the at least one receiving device--.

Column 10,
Line 4, "catch" should read --cache--;
Lines 23 and 24, after "expected expiration time." cancel "least one file for an indefinite period of time";
Line 46, "selctable" should read --selectable--.

Signed and Sealed this
Sixteenth Day of August, 2016

Michelle K. Lee
*Director of the United States Patent and Trademark Office*